United States Patent
Crowley et al.

(10) Patent No.: US 8,254,831 B1
(45) Date of Patent: *Aug. 28, 2012

(54) WIRELESS HOTSPOT BILLING ARRANGEMENT FOR A WIDE VARIETY OF PERSONAL COMMUNICATION DEVICES

(75) Inventors: Robert J. Crowley, Sudbury, MA (US); Donald N. Halgren, Manchester, MA (US)

(73) Assignee: Chester Holdings, LLC, Manchester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/136,748

(22) Filed: Aug. 9, 2011

Related U.S. Application Data

(63) Continuation of application No. 12/931,050, filed on Jan. 20, 2011, now Pat. No. 8,180,279, which is a continuation of application No. 12/218,324, filed on Jul. 14, 2008, now Pat. No. 7,881,664, which is a continuation of application No. 11/020,450, filed on Dec. 22, 2004, now Pat. No. 7,400,858, and a continuation of application No. 11/728,487, filed on Mar. 26, 2007, now Pat. No. 7,421,253, which is a continuation of application No. 10/619,770, filed on Jul. 15, 2003, now Pat. No. 7,197,285, which is a continuation of application No. 09/634,140, filed on Aug. 8, 2000, now Pat. No. 6,885,845, which is a continuation of application No. 08/604,105, filed on Feb. 20, 1996, now Pat. No. 6,594,471.

(51) Int. Cl.
*H04B 1/60* (2006.01)

(52) U.S. Cl. .............. 455/9; 455/14; 455/405; 455/406; 455/41.2; 455/420; 343/703

(58) Field of Classification Search ........... 455/9, 575.5, 455/575.7, 575.6, 14, 405, 406, 420, 41.2, 455/67.11, 557, 456, 556, 90.3, 456.1, 454, 455/463, 552.1, 556.1, 115.1, 151.4, 341, 455/106; 343/702, 703
See application file for complete search history.

(56) References Cited

U.S. PATENT DOCUMENTS

| | | | | |
|---|---|---|---|---|
| 4,661,992 A * | 4/1987 | Garay et al. | ................. | 455/90.3 |
| 5,603,080 A * | 2/1997 | Kallander et al. | .............. | 455/14 |
| 8,112,131 B2 * | 2/2012 | Crowley et al. | ............ | 455/575.1 |
| 8,180,279 B2 * | 5/2012 | Crowley et al. | ................... | 455/9 |
| 2009/0195349 A1 * | 8/2009 | Frader-Thompson et al. | | 340/3.1 |

* cited by examiner

*Primary Examiner* — Tan Trinh
(74) *Attorney, Agent, or Firm* — Don Halgren

(57) ABSTRACT

A system for enabling the wireless use and billing for that use of any of a wide variety of different manufacturers personal, ground-position-indicating enabled, wireless electronic rf communication devices in a zone, and a network outside of the zone.

20 Claims, 4 Drawing Sheets

WIRELESS HOTSPOT BILLING ARRANGEMENT FOR A WIDE VARIETY OF PERSONAL COMMUNICATION DEVICES

This invention relates to a docking system for handheld electronic communication devices such as cellular telephones or the like, for use with structures or vehicles, and this application is a continuation of U.S. patent application Ser. No. 12/931,050, filed Jan. 20, 2011, now U.S. Pat. No. 8,180,279, issued May 15, 2012, which is a continuation of U.S. patent application Ser. No. 12/218,324, filed Jul. 14, 2008, now U.S. Pat. No. 7,881,664, issued Feb. 1, 2011 (and is a sister patent of U.S. Pat. No. 7,904,124 issued Mar. 8, 2011), and which '664 patent is a continuation of U.S. patent application Ser. No. 11/020,450, filed Dec. 22, 2004, issued on Jul. 15, 2008 as U.S. Pat. No. 7,400,858, and patent application Ser. No. 11/728,487 filed Mar. 26, 2007 now U.S. Pat. No. 7,421,253, which is a continuation of Ser. No. 10/619,770 filed Jul. 15, 2003, now U.S. Pat. No. 7,197,285, which are each a continuation applications of Ser. No. 09/634,140, filed Aug. 8, 2000, now U.S. Pat. No. 6,885,845, which is a continuation of Ser. No. 08/604,105, filed Feb. 20, 1996, now U.S. Pat. No. 6,594,471, each of which patents, applications, their respective U.S. Patent Office and U.S. Federal District Court records and their file histories, are all incorporated herein by reference in their entirety.

BACKGROUND OF THE INVENTION

Field of the Invention

Prior Art

Extraneous radio frequency emission has become a serious concern of hand-held electronic communication devices such as portable facsimile machines, ground position indicators, and cellular telephone manufacturers- and users alike. RF radiation is considered a potential carcinogen.

The proliferation of these hand-held devices is evident everywhere. A single hand-held device however, should able to travel with its owner and be easily transferably usable in automobiles, planes, cabs or buildings (including hospitals) as well as at offices and at desks with no restrictions on their use, and without causing concern with regard to the radiation therefrom. The hand-held devices should be portable for a user to carry in his pocket, yet be able to use that same cellular unit in such vehicle or building while minimizing such radiational effect therein.

It is an object of the present invention to permit a user of a portable hand-held electronic communication device such as a cellular telephone or the like, to conveniently use that same hand-held device/cellular phone in an automobile, plane or building, office/desk, or anywhere signal transmission is needed, and to permit such signal to reach its intended destination such as a communications network or satellite, without interfering with other electrical equipment and in spite of interfering walls of buildings or structure and/or other electrical equipment.

It is a further object of the present invention to minimize any radiation from such a portable device, such as a cellular telephone or the like, while such use occurs in an automobile, a building or an elevator, an airplane, a cab, or other public facility in which the user wishes to minimize his own exposure to stray radiation, and also to permit re-transmission of his signal, to avoid the necessity of connecting and disconnecting cables, and to permit a wide variety of cellular telephones such as would be utilized in a rental car where various manufactures' phones would be used, and to permit control of such re-transmission of signals where desired, so as to allow user/customer billing and monitoring thereof.

BRIEF SUMMARY OF THE INVENTION

The present invention comprises a docking system adaptable to an automobile, plane, building or desk for receipt of an electronic communication device such as a cellular telephone, portable computer, facsimile machine, pager or the like, to permit a user safe, environmentally safe, non-touching, radiationally communicative mating of the antenna of that device to a further transmission line through a juxtaposed pick-up probe, the signal coming in or going out through a communications network or further remote antenna.

The docking system may comprise a "zone" or "focal area" as a generally rectilinear area/volume on/in a desk or work surface on/in which the electronic communication device may be placed, such a surface or space being possible on a desk, or in a plane. That focal area may also, in a further embodiment, be comprised of one or more rooms in a building, such focal area having a pick-up probe thereat, in conjunction with a shield placed on/in the desk, room, vehicle or building to prevent the radiation from that communication device from traveling in any undesired directions within the desk, room, vehicle or building.

The focal area may be defined by a metal walled structure within or on which a broadband probe is arranged. The metal walled structure acts as a shield to minimize radiation from the communication device from passing therethrough. In a first embodiment, the shield may be comprised of a partial housing disposed within the upper work surface of a desk. The probe would be elongatively disposed within the partial housing and be in electrical communication with a transmission line such as coax cable, waveguide, or the like. The partial housing may have a planar dielectric layer thereover, which would also be co-planar with the surface of the desk. The communication device would be placed within the pickup zone of the focal area, and would be able to transmit and receive signals through the dielectric layer. The partial housing would act as the shield in the desk, to minimize radiation by the worker at the desk. In a further embodiment, the housing may be comprised of a thin, generally planar mat of conductive material, which mat may be flexible and distortable, for conformance to a particular work surface and for ease of storage capabilities. The mat has an upper layer of dielectric material (for example, plastic, foam or the like). A thin, flat, conformable coupling probe may be embedded into or printed onto the upper surface of the dielectric material. The mat may be utilized as a portable focal area for placement of a communication device thereon, or wrapped up in an enveloping manner therein.

A yet further embodiment of the present invention includes a control unit in the transmission line from the pickup probe to the further remote antenna. The control unit may comprise a filter or switch connected to a computer. The computer may accumulate billing information, control system functions, or act as a regulator for multiple users of the antenna coupling system.

The invention thus comprises a docking system for connecting a portable communication device to a further signal transmission line, the portable communication device having an externally radiative antenna, the system comprising a shield for restricting at least a portion of any radiation from the externally radiative antenna of said portable communication device, and a coupling probe mounted adjacent to the shield for radiatively coupling between the externally radiative antenna of the portable communication device and the further signal transmission line via radio frequency energy therebetween. The shield may be comprised of an electrically conductive material, or an attenuative material capable of blocking at least part of the radiofrequency radiation energy coming from the communication device(s) connected thereto. The shield defines a focal area for receipt and transmission of a radio frequency signal, when a communication device is placed within the focal area. The focal area or zone, may be selected from the group of structures consisting of a desk, a room in a building, or a tray or the like in a vehicle. The further signal transmission line may be connected to a further communication network and/or a further antenna connected to the transmission line, yet positioned at a location remote from the shield. The transmission line may have a control unit therein, the control unit being arranged to permit regulation of signals being transmitted through the transmission line. The control unit may comprise a computer arranged to monitor time or use of the docking system. The shield and the probe may be spaced apart by a dielectric material. The shield, the probe and the dielectric material may be flexible. The communication device may include at least two cellular telephones (or other portable communication devices) simultaneously connected to the remote antenna.

The invention also includes a method of coupling a portable communication device having an externally radiative antenna, to a signal transmission line having a further remote antenna thereon, for the purpose of effecting radio signal transmission therebetween, the method comprising the steps of arranging a radiation shield in juxtaposition with at least a portion of said radiative antenna of the portable communication device, mounting a coupling probe adjacent the shield and in communication with the signal transmission line, and placing the externally radiative antenna of the portable communication device close to the probe and the shield so as to permit radiative communication between the externally radiative antenna and the signal transmission line via the coupling probe. The method may include arranging the shield in or on a generally planar work surface so as to restrict the propagation of at least a portion of the radiation emanating from the communication device primarily only to the vicinity of the probe. The method may include attaching a control unit to the transmission line to permit regulation of electric signals therethrough, and adding a further communication device in juxtaposition with a further probe, the further probe also being in electronic communication with that control unit, so as to permit multiple simultaneous use of the transmission line and communication system and/or remote antenna therewith. The method of coupling the portable communication device to the signal transmission line, may also include the step of billing any users of the communication and/or remote antenna by monitoring and tabulating any signals received by and sent through the control unit.

It is an object of the present invention to provide a shielded antenna docking arrangement, which itself may be portable, for use with a portable communication device such as a cellular telephone, facsimile machine or ground position indicator or the like, such use occurring in a vehicle such as a plane, an automobile or a cab or in a public or private building, office desk or elevator.

BRIEF DESCRIPTION OF THE DRAWINGS

The objects and advantages of the present invention will become more apparent when viewed in conjunction with the following drawings in which:

FIG. 1b is a partial view taken along the lines A-A of FIG. 1a;

FIG. 2b is a view taken along the lines B-B of FIG. 2a;

FIG. 3b is a block diagram of a further embodiment of that shown in FIG. 3a.

DESCRIPTION OF THE PREFERRED EMBODIMENTS

Figure 1A:
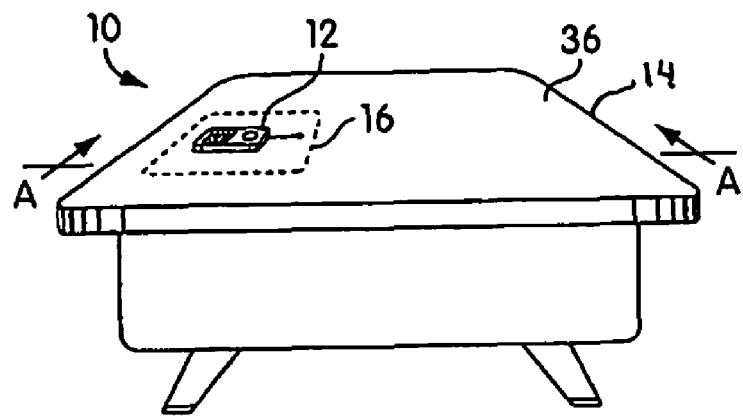
FIG. 1a is a perspective view of a focal area docking arrangement, as may be utilized with a desk.

Referring now to the drawings in detail, and particularly to FIG. 1a, there is shown a portable communication device docking arrangement 10, to permit a portable communication device such as a hand-held cellular telephone 12 to be utilized thereon, such as on a desk 14 or adjacent to it, and as a personal communicator (i.e. cellular telephone, facsimile machine, pager or the like) which may also be carried on an individual.

Such a docking system 10 of the present invention may also be adaptable to an automobile, plane, or building for providing radiationally restrictive communication between a portable electronic communication device 12 such as a cellular telephone, portable computer, facsimile machine, pager, or the like, while allowing communicative mating of the radiative antenna of that device to a further transmission line and communication system and/or a more remote antenna, as recited and shown in our aforementioned patent applications, incorporated herein by reference in their entirety.

The docking system 10 may comprise a "zone" or "focal area" 16 as a rectilinear area/volume on/in a desk 14 or work surface on/in which the electronic communication device 12 may be placed, such a surface or space being in a structure such as an airplane. That focal area 16 has a pick-up coupling probe 22 thereat, as shown for example in FIG. 1b, in conjunction with a shield 24 placed on/in the desk 14, (or room, vehicle or building, as shown in FIGS. 3a and 3b), to prevent the radiation (electromagnetic/microwave) emanating from that communication device 12 from traveling in any undesired directions within the desk, room, vehicle or building.

Figure 1B:
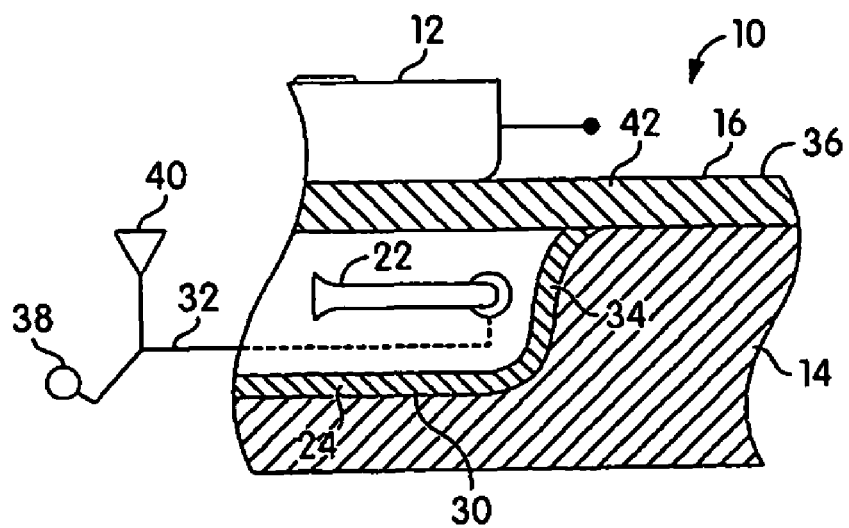

The focal area 16 may be defined by a metal walled housing structure 30 within which a broadband probe 22 is arranged, as shown in FIG. 1b. The metal walled structure 30 acts as a shield to minimize undesired radiation from the communication device 12 from passing therethrough. In a first embodiment, the shield may be comprised of a partial housing 34 disposed within the upper work surface 36 of a desk 14, as may be seen in FIG. 1b. The pick-up probe 22 would be elongatively disposed within the partial housing structure 30 and be in electrical communication with a transmission line 32 such as coaxial cable, waveguide, or the like. The transmission line 32 would be in electrical communication with an electric communications network or distribution system 38, and/or to a further remote antenna 40, such as may be seen in FIGS. 1b, 3a and 3b. The partial housing 30 may have a planar dielectric layer 42 thereover, which would also be co-planar with the surface of the desk 14. The communication device 12 would be placed within the pickup zone of the focal area 16, and would be able to transmit and receive signals through the dielectric layer 42. The partial housing 30 would act as the shield in the desk, to minimize radiation directed towards the worker(s) at the desk.

Figure 2A:
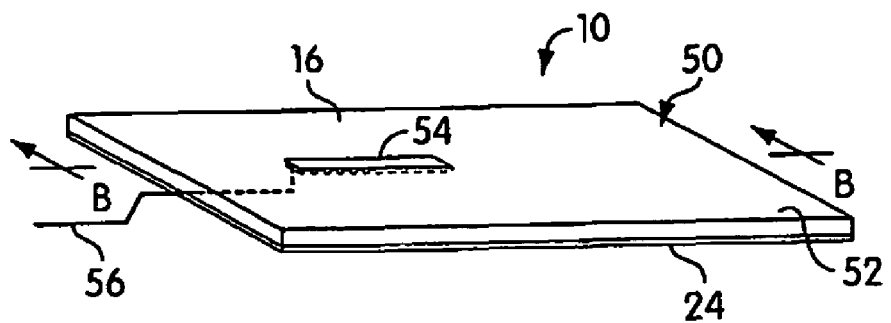
FIG. 2a is a perspective view of a portable focal area docking system for portable communication devices.
Figure 2B:
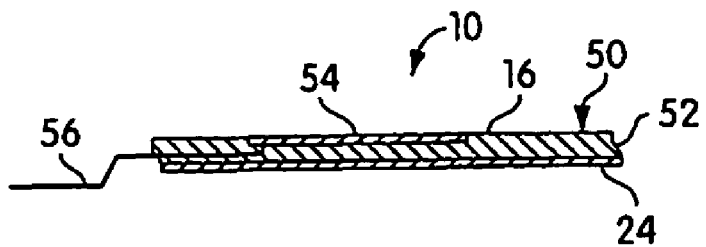

In a further embodiment as shown in FIG. 2a, the shield or housing may be comprised of a thin, generally planar mat 50 of conductive material, which mat 50 may be flexible and distortable, for conformance to any surface (human or otherwise), and may be folded or rolled up to minimize storage requirements. The mat 50 has an upper layer 52 made of a dielectric material (plastic, foam or the like). A thin, flat, conformable coupling probe 54 is embedded into or printed onto the upper surface of the layer of dielectric material 52. The mat 50 may be utilized as a portable focal area for placement of a communication device thereon, or wrapped-up in an enveloping manner therein. The probe 54 is connected to a transmission line 56, in electrical contact with a network or remote antenna, not shown in this figure.

Figure 3A:
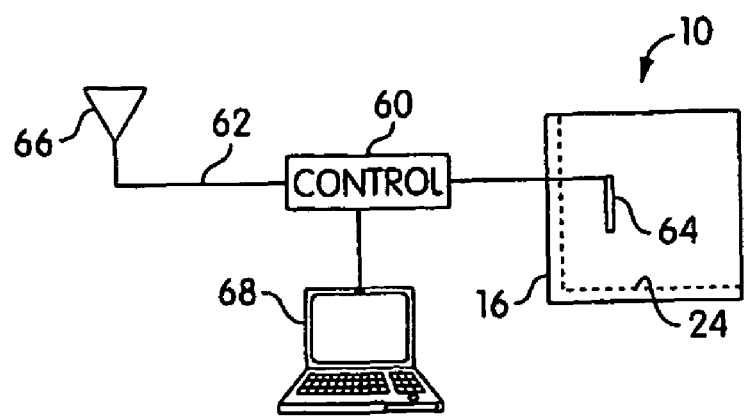
FIG. 3a is a block diagram of a docking system having a sensor unit arranged therewith.
Figure 3B:
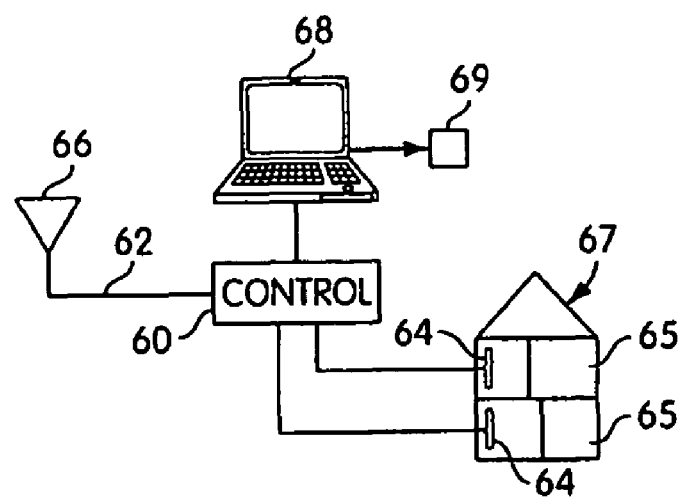

A yet further embodiment of the present invention includes a control unit 60, connected into the transmission line 62 from the pickup probe 64 to the further remote antenna 66 shown in FIGS. 3a and 3b. The control unit 60 may comprise a filter, switch, amplifier, attenuator, combiner, splitter, or other type of frequency converter, connected to a computer 68. The computer 68 may be arranged to accumulate customer or billing information by functioning with a processor to print out use-data 69, to maintain frequency control functions, or to act as a regulator for multiple users of the antenna coupling system 10. There may be a plurality of pickup coupling probes 64 each connected to the control unit 60 and the transmission line 62, one probe 64 in each of a plurality of shielded rooms 65, each wall or work area (desk) having a shield, the rooms 65 shown in a building 67, in FIG. 3b.

Figure 4:
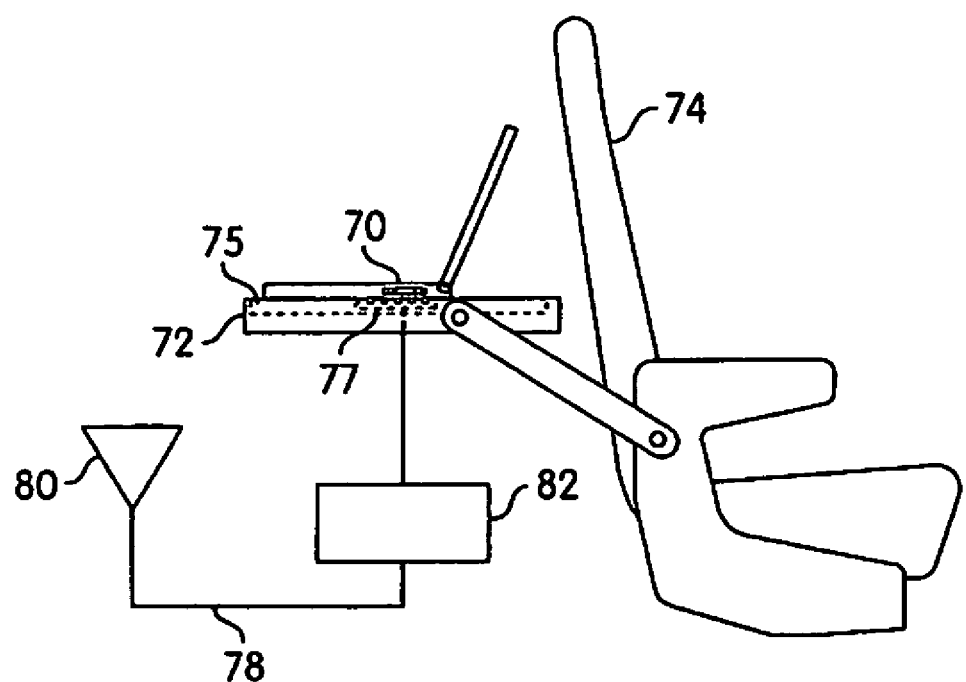
FIG. 4 is a side elevational view of a docking system, as it may be utilized in a vehicle.

The view shown in FIG. 4, displays a portable communication device such as a facsimile machine or computer 70 supported on a tray 72 articulably mounted on the back of an airplane seat 74. The tray 72 has a "focal area" 75 therewithin, as represented by the dashed lines 76. The focal area 75 includes a conductive (preferably metallic) shield arranged beneath and partially surrounding a broadband probe 77. The probe 77 transmits electrical signals radiated to and from a radiative antenna on or in the base of the portable communication device 70. A transmission line 78 which may be comprised of coaxial cable, waveguide, or optical fibers, extends from the probe within the focal area, to a further remote antenna 80 mounted outside of the structure, which here, is identified as an airplane.

A control unit 82, such as attenuators, heterodyne converters, amplifiers, bandpass filters, switches, or the like, may be arranged in communication with the transmission line 78 to monitor or control the time in the vehicle in which the communication device may be utilized, for example, to limit certain times when such devices may be utilized in an airplane, or to modulate the signal being transmitted or received by the remote antenna, and/or to monitor usage of the docking system for subsequent billing of those users.

Thus what has been shown is a unique system for minimizing the detrimental effects of radiation from common portable communication devices to their users, while improving the transmission capabilities and customer usage of such devices, overcoming the barriers such as buildings and vehicles in which such devices might otherwise be utilized, that would interfere with the flow of signals transmitted.

We claim:

1. A system for enabling wireless billable communication between a wide variety of different manufacturers various ground-position-indicating personal communication devices within a zone and a further communication network, wherein each of the communication devices in the wide variety of communication devices has an externally radiative rf antenna, the system comprising:

at least one first rf antenna arranged within the zone arranged to communicate wirelessly with a radiative rf antenna of any different manufacturers various wireless personal communication devices being communicatively utilized within the zone;

at least one signal transmission line arranged to communicate with a communication device located outside of the zone;

a wide-variety-of-different-manufacturers personal-communication-devices-responsive monitoring and control computer arranged in a communications link between the at least one first rf antenna within the zone and the at least one signal transmission line arranged to communicate outside of the zone, the wide-variety-of-different-manufacturers personal-communication-devices-responsive monitoring and control computer being arranged to simultaneously monitor and control the use and enable billing of any of a wide variety of any different manufacturers various wireless ground-position-indicating personal communication devices utilized between the zone and an electronic communication device located outside of the zone.

2. The system as recited in claim 1, where the monitoring and control computer is arranged to control the amount of time any various wireless personal communication devices may be utilized to communicate from within the zone, with any other communication devices located outside of the zone.

3. The system as recited in claim 1, where the monitoring and control computer operates to monitor costs of utilizing any various and different wireless personal communication device within the zone.

4. The system as recited in claim 1, where the at least one outside transmission line comprises an rf transmissive antenna which is arranged to communicate wirelessly with a communication device located outside of the zone.

5. The system as recited in claim 4, wherein the communication device located outside of the zone comprises a satellite.

6. The system as recited in claim 1, wherein the wide variety of communication devices are selected from the group consisting of: a cellular telephone, a computer, a facsimile machine and a ground position indicating device.

7. The system as recited in claim 6, wherein the wide variety of communication devices are portable.

8. The system as recited in claim 1, wherein the wide variety of communication devices are pocket carryable.

9. The system as recited in claim 1, wherein the system is a mobile system.

10. The system as recited in claim 1, wherein the zone is selected from the group consisting of: a vehicle, a building, a work space, a rectilinear area, a volume of space and a signal pickup space.

11. The system as recited in claim 1, wherein the monitoring and control computer operates to filter electronic signals sent to and or sent from any various and different wireless personal communication device utilized within the zone.

12. A method for enabling the wireless use and billing for that use of any of a wide variety of different manufacturers personal, ground-position-indicating enabled, wireless electronic rf communication devices in a zone, comprising:

arranging a first rf antenna within the zone for communicating with any of a wide variety of any different manufacturers various personal wireless rf communication devices utilized wirelessly within the zone;

connecting a transmission line in communication with the first rf antenna in the zone, the transmission line arranged to communicate with other electronic communication devices located outside of the zone;
placing a control unit in a link between the first rf antenna arranged in the zone and the transmission line arranged to communicate with other electronic devices outside of the zone, the control unit being arranged to control, affect amplification of, and transmit electronic signals including billing information relative to any wireless rf use, and any electronic rf communication signals sent to and from any of the wide variety of different manufacturers various personal wireless rf communication devices utilized within the zone.

13. The method as recited in claim 12, including:
connecting the transmission line to a further antenna.

14. The method as recited in claim 12, including:
establishing a wireless communication between the transmission line and a satellite.

15. The method as recited in claim 12, including:
enabling the control unit to be responsive to ground position indication input from any of a wide variety of different manufacturers various personal, wireless rf communication devices utilized within the zone.

16. The method as recited in claim 12, including:
shielding at least a portion of the zone to electronic rf signals.

17. The method as recited in claim 12, including:
filtering by the control unit, of at least some electronic signals sent to and/or from the first rf antenna within the zone and the transmission line communicating with electronic devices outside of the zone.

18. The method as recited in claim 12, including:
billing for any billable use of any of a wide variety of different manufacturers various personal wireless rf communication devices utilized within the zone.

19. A system for enabling wireless communication between a wide variety of different manufacturers various ground-position-indicating enabled personal communication devices within a zone and a further communication network, wherein each of the communication devices in the wide variety of communication devices has an externally radiative rf antenna, the system comprising:
at least one first rf antenna arranged within the zone arranged to communicate wirelessly with an rf antenna of any different manufacturers various wireless ground-position-indicating enabled personal communication devices being communicatively utilized within the zone;
at least one signal transmission line arranged to communicate with a communication device located outside of the zone;
a wide-variety-of-different-manufacturers personal-communication-devices enabled monitoring-and-control computer arranged in a communications link between the at least one first rf antenna within the zone and the at least one signal transmission line arranged to communicate outside of the zone, the wide-variety-of-different-manufacturers personal-communication-devices enabled monitoring and control computer being arranged to simultaneously monitor the use of any of a wide variety of any different manufacturers various wireless ground-position-indicating enabled personal communication devices utilized within the zone and an electronic communication device located outside of the zone.

20. The system as recited in claim 19, where the transmission line is in communication through a satellite with other communication devices located outside of the zone.

* * * * *